(12) United States Patent
Oishi

(10) Patent No.: US 9,569,415 B2
(45) Date of Patent: Feb. 14, 2017

(54) INFORMATION PROCESSING APPARATUS, METHOD AND A STORAGE MEDIUM FOR ORIGINAL DOCUMENT EDITING

(71) Applicant: CANON KABUSHIKI KAISHA, Tokyo (JP)

(72) Inventor: Tetsu Oishi, Auderghem (BE)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/795,464

(22) Filed: Jul. 9, 2015

(65) Prior Publication Data

US 2016/0019446 A1    Jan. 21, 2016

(30) Foreign Application Priority Data

Jul. 16, 2014   (JP) .................................. 2014-146086

(51) Int. Cl.
| | | |
|---|---|---|
| G06K 15/02 | (2006.01) | |
| G06F 17/24 | (2006.01) | |
| H04N 1/387 | (2006.01) | |
| G06T 11/60 | (2006.01) | |

(52) U.S. Cl.
CPC ............. *G06F 17/24* (2013.01); *G06T 11/60* (2013.01); *H04N 1/387* (2013.01); *G06K 15/1852* (2013.01)

(58) Field of Classification Search
None
See application file for complete search history.

(56) References Cited

U.S. PATENT DOCUMENTS

| | | | | |
|---|---|---|---|---|
| 5,557,707 A | * | 9/1996 | Inoue ................... | G06F 17/243 358/1.9 |
| 7,969,631 B2 | * | 6/2011 | Koyama ................ | G06K 9/222 358/537 |
| 8,209,603 B2 | * | 6/2012 | Bailor ................... | G06F 17/24 711/132 |
| 8,453,052 B1 | * | 5/2013 | Newman ............. | G06F 17/2211 715/255 |
| 8,670,631 B2 | | 3/2014 | Oishi | |
| 8,885,226 B2 | | 11/2014 | Oishi | |
| 8,914,719 B2 | * | 12/2014 | Sugimoto ............. | G06F 17/211 358/1.15 |
| 2010/0235763 A1 | * | 9/2010 | Massand ............. | G06F 17/2229 715/753 |
| 2011/0038004 A1 | | 2/2011 | Oishi | |
| 2012/0072821 A1 | * | 3/2012 | Bowling ................ | G06F 17/24 715/229 |
| 2012/0221947 A1 | * | 8/2012 | Yukumoto ............ | G06F 17/212 715/273 |
| 2014/0002858 A1 | * | 1/2014 | Maruyama ............ | G06F 3/1208 358/1.15 |

FOREIGN PATENT DOCUMENTS

JP         2005-010841         1/2005

* cited by examiner

*Primary Examiner* — Scott A Rogers
(74) *Attorney, Agent, or Firm* — Fitzpatrick, Cella, Harper & Scinto

(57) ABSTRACT

In the case where an original document is edited, tints may be different at the time of printing because the attributes of drawings are different although they resemble each other. A specifying unit configured to specify contents of editing for an original document and a determination unit configured to determine a form of representation of the specified contents of editing so as to conform with the form of representation of an object in the original document are provided.

13 Claims, 14 Drawing Sheets

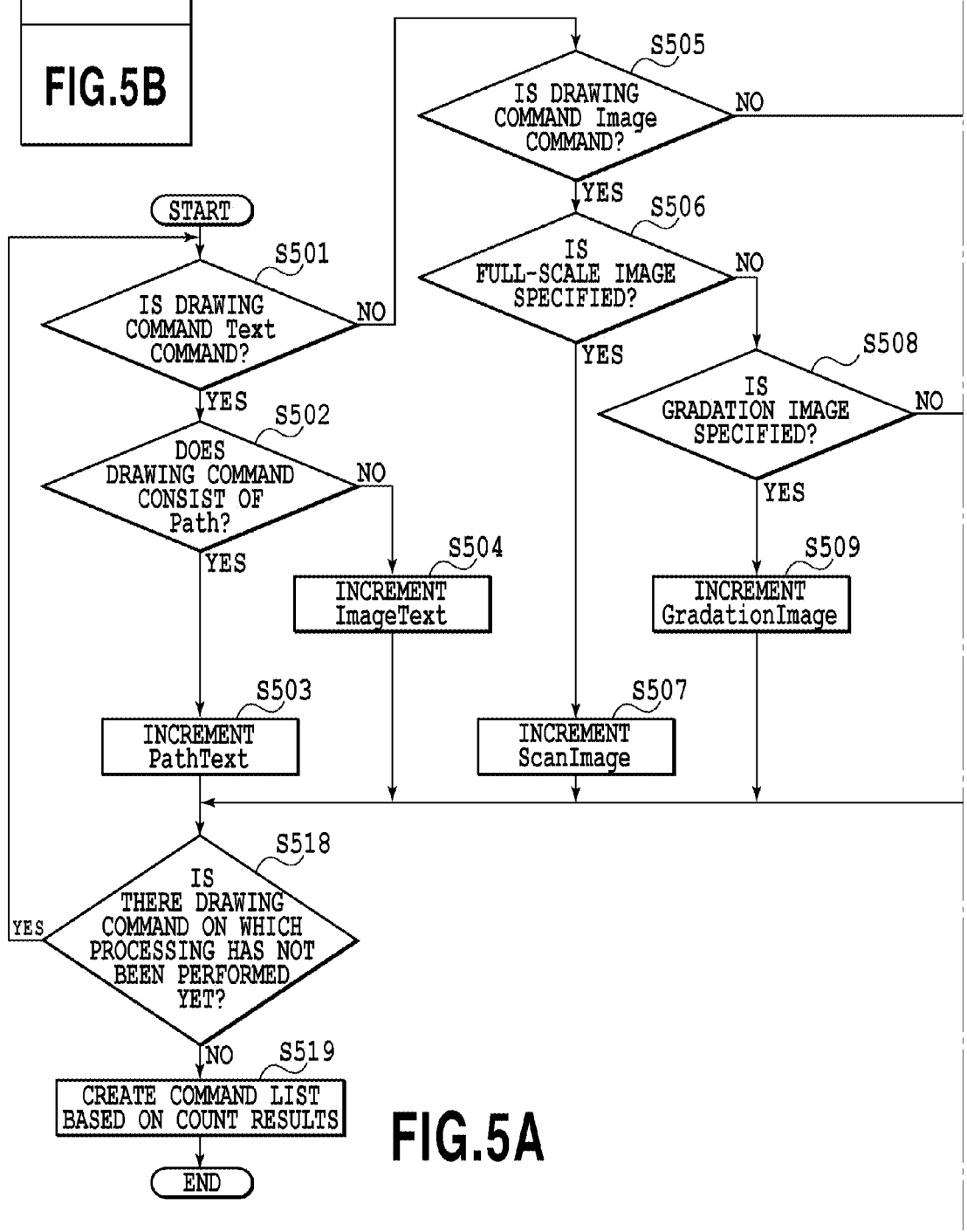

APPLICATION A:Gradation by Image
APPLICATION B:Text by Graphics
APPLICATION C:Rectangle by Image
APPLICATION D:Rectangle by Fill

FIG.8

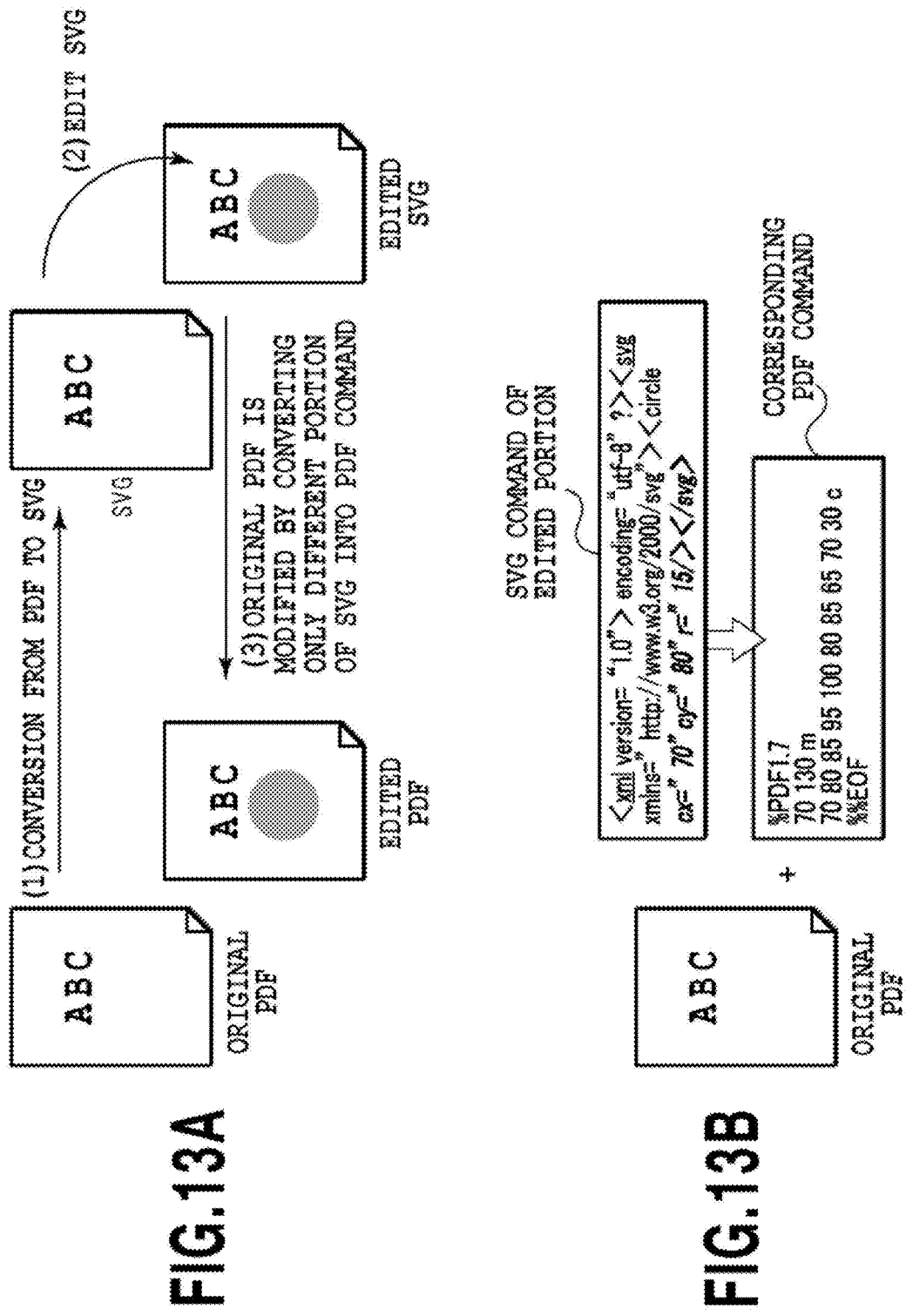

INFORMATION PROCESSING APPARATUS, METHOD AND A STORAGE MEDIUM FOR ORIGINAL DOCUMENT EDITING

BACKGROUND OF THE INVENTION

Field of the Invention

The present invention relates to an information processing apparatus, an information processing method, and a storage medium.

Description of the Related Art

It is often that an original document (e.g., a PDF document) is edited to add information (e.g., an annotation of a character string, such as "Confidential"). Japanese Patent Laid-Open No. 2005-10841 has disclosed a technique in which after an original document created in the PDF format is converted into another format and then edited, the edited portion is converted again into the PDF command and only the edited portion is merged with the original PDF document.

In the case where such editing to add information as described above is performed, a preferable way to add information depends on the situation. For example, in the case where an annotation of the character string "Confidential" is newly added, it is sometimes preferable to add the annotation as text, it is sometimes preferable to add the annotation as a graphics, and it is sometimes preferable to add the annotation as an image.

For example, in the case where the character string included in the original document is represented in text, a character string to be added newly should be added similarly as text. On the other hand, in the case where the character string included in the original document is represented in a graphics, a character string to be added newly should be added similarly as a graphics. Further, in the case where the character string included in the original document is represented in an image, a character string to be added newly should be added similarly as an image. The reason is that in the case where the above is not obeyed, the tint or the like is different between objects of the same type and a sense of incongruity occurs at the time of printing the document after editing (i.e., the document after information is added). The above occurs because image processing in accordance with the attribute of the object is performed in a general printing apparatus. For example, while image processing dedicated to text (e.g., processing to sharpen an edge) is performed in the case where text is printed and image processing dedicated to a photo (e.g., blurring processing) is performed in the case where an image is printed, such image processing is not performed in the case where a graphics is printed.

Consequently, in the case where a character string is newly added as an image to the original document in which the character string is represented in text, and then the original document is printed, the appearance of the character string that originally exists within the original document differs from that of the character string having been newly added in the printing results, and therefore, a sense of incongruity will result.

SUMMARY OF THE INVENTION

An information processing apparatus according to the present invention has a specifying unit configured to specify contents of editing for an original document and a determination unit configured to determine a form of representation of the specified contents of editing so as to conform with the form of representation of an object in the original document.

Further features of the present invention will become apparent from the following description of exemplary embodiments (with reference to the attached drawings).

BRIEF DESCRIPTION OF THE DRAWINGS

FIG. 5 is a diagram showing a relationship between FIGS. 5A and 5B; and FIGS. 5A and 5B are flowcharts showing a flow of command list creation processing;

FIG. 8 is a diagram showing an example of application feature information;

FIG. 13A is a diagram explaining an example in the case where the present invention is applied to editing accompanied by format conversion; and FIG. 13B is a diagram explaining an example in the case where the present invention is applied to editing accompanied by format conversion.

DESCRIPTION OF THE EMBODIMENTS

Hereinafter, with reference to the drawings, the present invention is explained in detail in accordance with preferred embodiments. Configurations shown in the following embodiments are merely exemplary and the present invention is not limited to the configurations shown schematically.

First Embodiment

Figure 1:
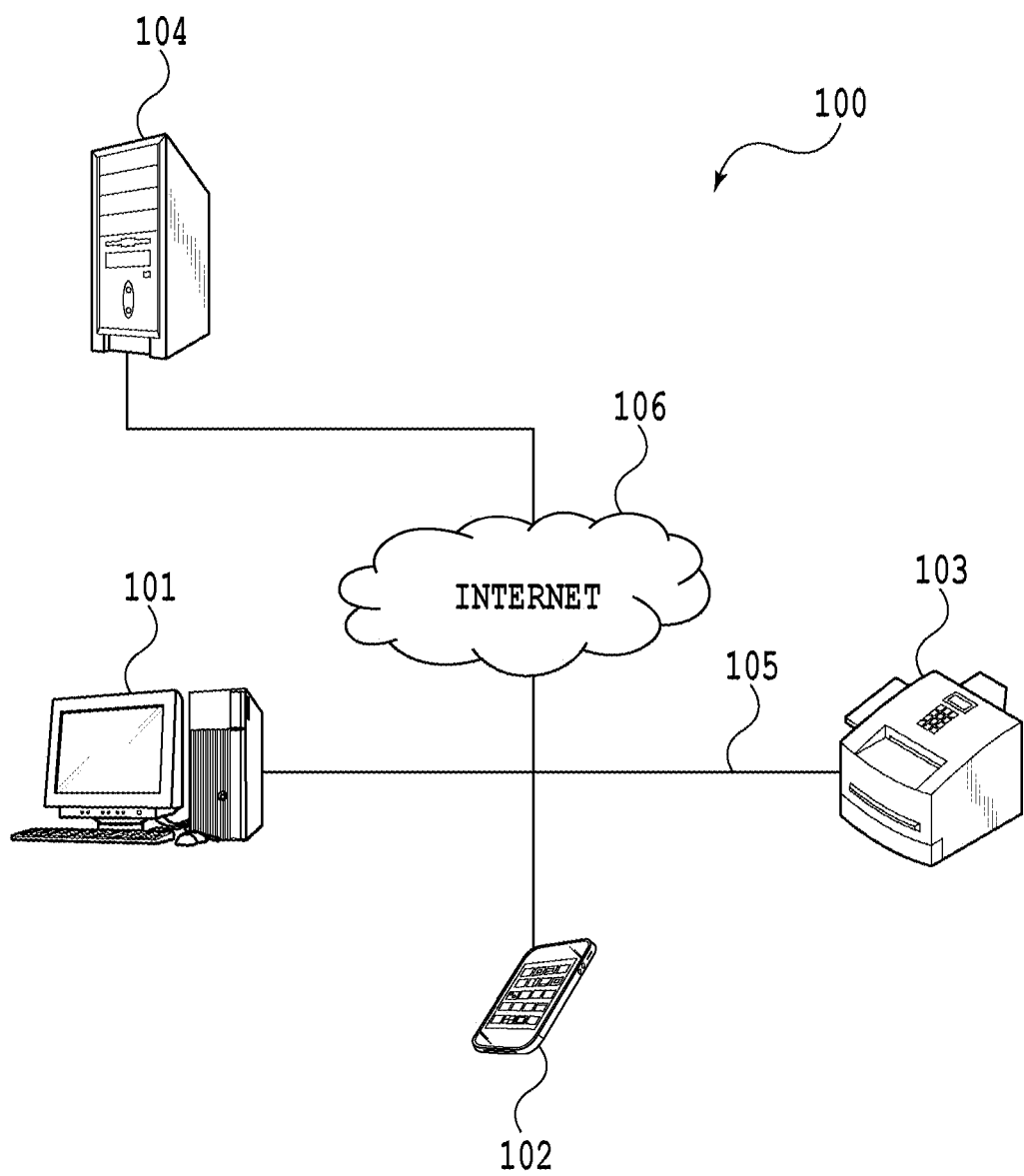
FIG. 1 is a diagram showing an example of a configuration of a document editing system according to a first embodiment.

FIG. 1 is a diagram showing an example of a configuration of a document editing system according to the present embodiment. A document editing system 100 includes a PC 101, a mobile terminal 102, a printing apparatus 103, and a Web application server (hereinafter, a server) 104.

The PC 101 is a computer as a client terminal, and the mobile terminal 102 is a mobile telephone, a tablet terminal, etc. It is possible for the PC 101 and the mobile terminal 102 to receive a document in a predetermined format (e.g., PDF) from the server 104 and to edit the document by using an editing application. The printing apparatus 103 is for example, an ink jet printer or electrophotographic printer, and is used for printing of an edited document. The PC 101, the mobile terminal 102, and the printing apparatus 103 are connected to one another via a network 105 and the network 105 is connected to the Internet 106.

The server 104 may include one server or a plurality of servers.

It may also be possible for the document editing system 100 to separately include a server (group) that provides a document editing application as an application service.

Figure 2:
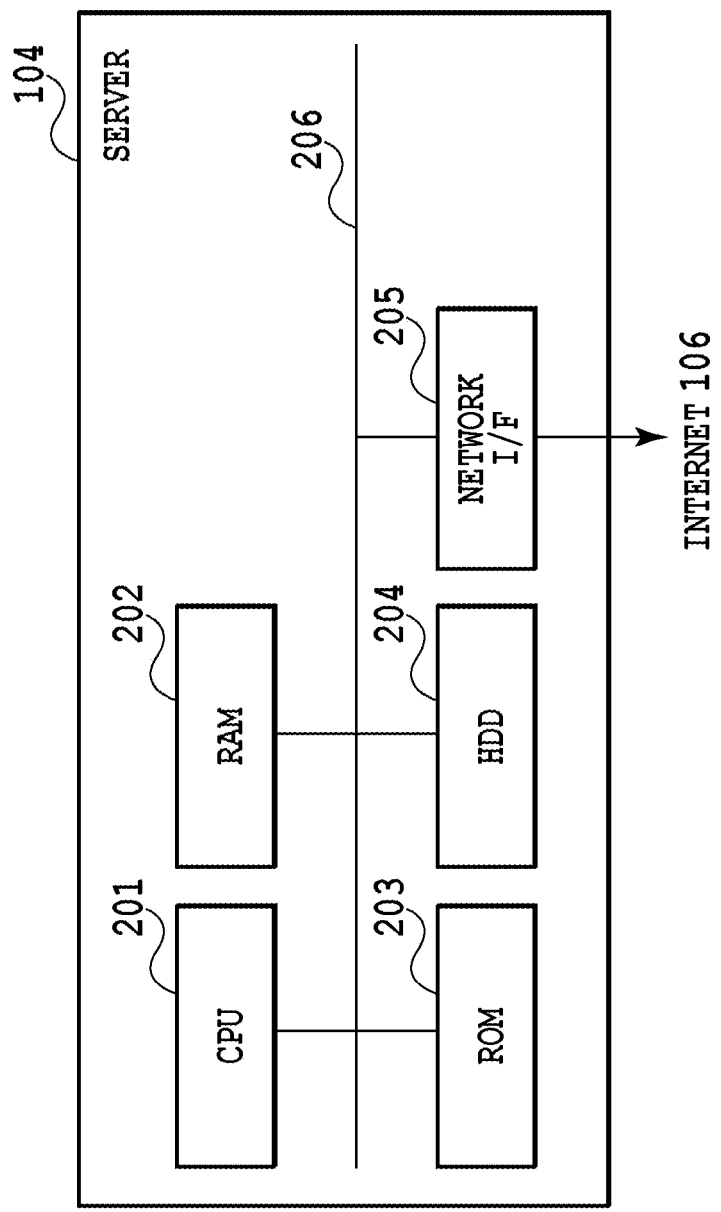
FIG. 2 is a block diagram showing an example of a hardware configuration of a server.

FIG. 2 is a block diagram showing an example of a hardware configuration of the server 104.

The server 104 includes a CPU 201, a RAM 202, a ROM 203, an HDD 204, a network I/F 205, and an internal bus 206.

In the ROM 203 or the HDD 204, control programs, such as an operating system and applications, are stored. The CPU 201 exhibits the function as a computer by reading the control programs onto the RAM 202 from the ROM 203 or the HDD 204 where necessary and then executing the programs.

The network I/F 205 is an interface that connects the internal bus 206 and the Internet 106 and performs transmission and reception of various types of data, such as a document in the PDF format, with another apparatus that is connected via the Internet 106.

Figure 3:
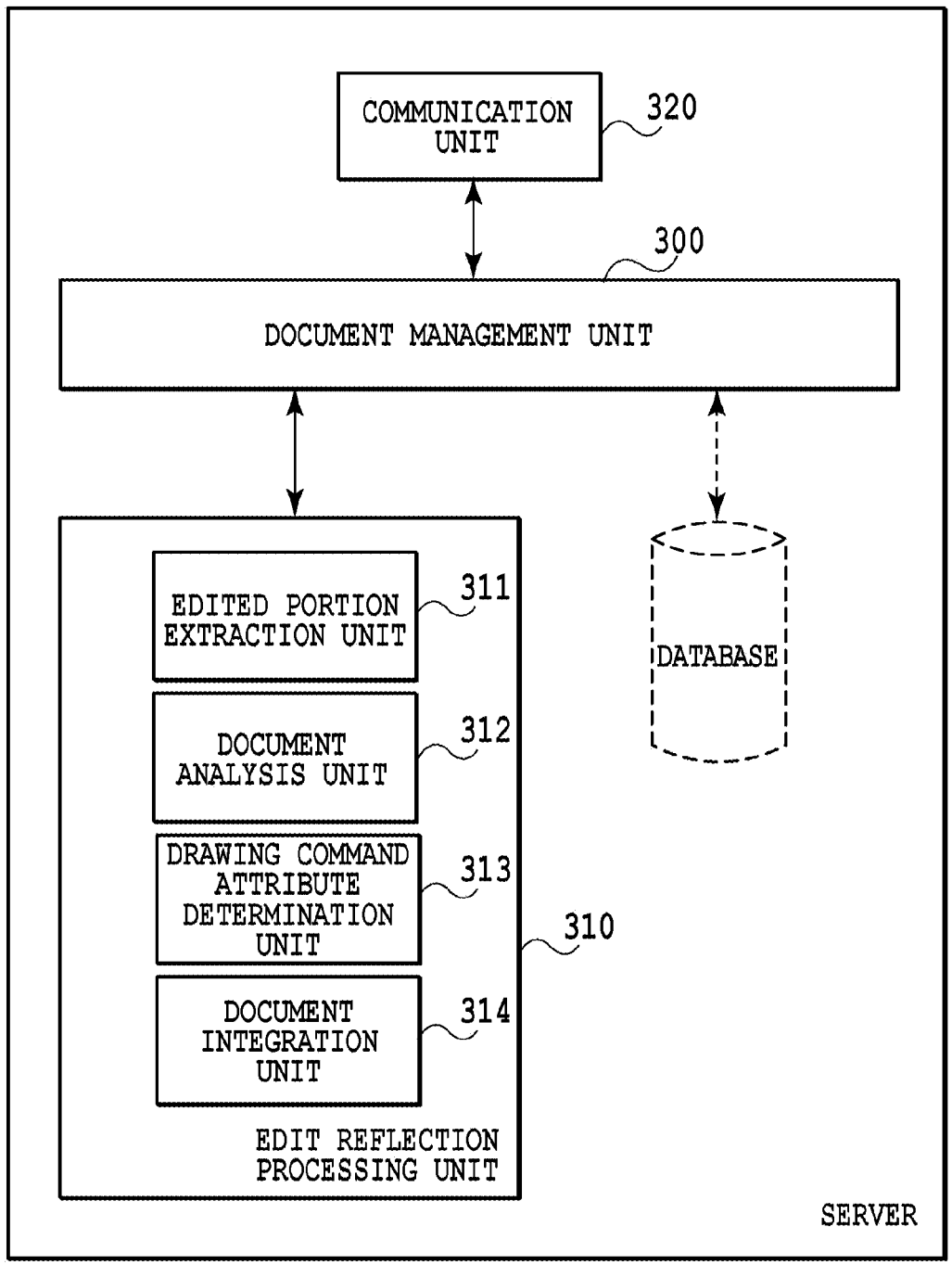
FIG. 3 is a block diagram showing an example of a software configuration of the server.

FIG. 3 is a block diagram showing an example of a software configuration of the server 104. Each unit as a software module, which is shown below, is implemented by the above-described CPU 201 developing the programs stored in the ROM 203 or the like onto the RAM 202 and executing the programs. However, part of these units may consist of a hardware logic.

A document management unit 300 manages data of a document created in a predetermined format, on which editing processing is to be performed. Specifically, the document management unit 300 performs processing as follows.

Processing to acquire data of an already-existing document (hereinafter, an original document) that is stored in a database (e.g., a DB server or the like, not shown, which may be provided outside) in response to user's instructions Processing to transmit the data of the original document to the PC 101 or the mobile terminal 102 that performs editing Processing to receive the data of the document on which editing has been performed (hereinafter, edited document) from the PC 101 or the mobile terminal 102

In the present embodiment, explanation is given by taking the PDF as a format of a document as an example, but as a matter of course, another format may be accepted.

An edit reflection processing unit 310 performs processing to reflect the contents of editing included in the received edited document in the original document. Reflecting the contents of editing in the original document includes the following four pieces of processing.

1) Processing to extract an edited portion from the edited document (specifying the contents of editing)

Figure 4:
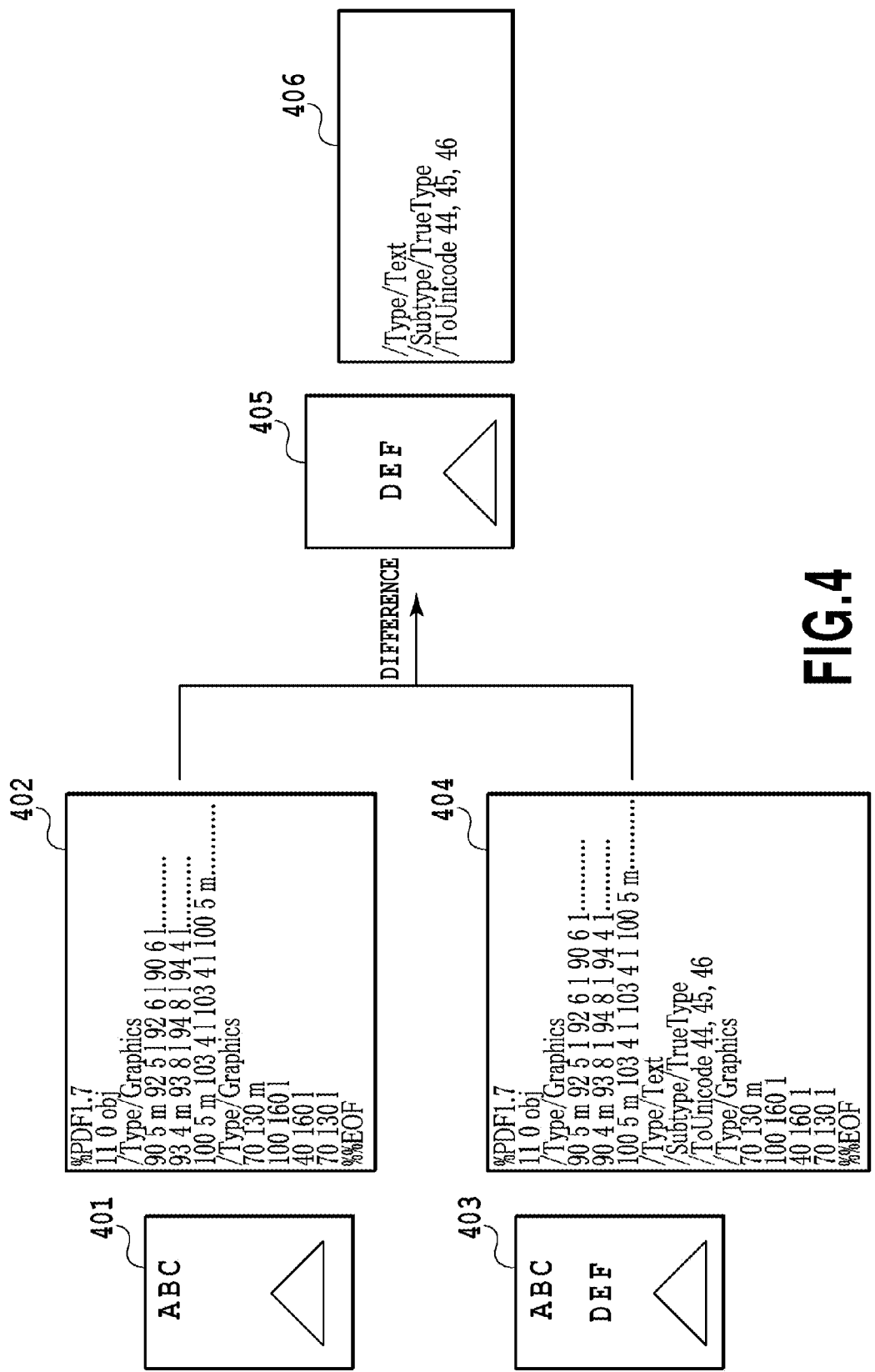
FIG. 4 is a diagram explaining the way a difference is extracted.

2) Processing to analyze the original document and to analyze the edited portion 3) Processing to determine the form of representation (attribute of the drawing command) of the extracted edited portion 4) Processing to integrate the edited portion (drawing command) for which the form of representation has been determined with the original document An edited portion extraction unit 311 extracts the edited portion from the edited document and specifies the contents of editing as described in 1). Specifically, the edited portion extraction unit 311 extracts a difference (edited portion) between the edited document and the original document by using a text difference extraction method or an image difference extraction method, which are already-known methods. FIG. 4 is a diagram explaining the way a difference is extracted. Reference numeral 401 denotes an original document before editing is performed and a character string "ABC" and a graphics of a triangle are drawn. Reference numeral 402 denotes a PDF drawing command for drawing the character string and the graphics in the original document 401. Reference numeral 403 denotes an edited document after editing is performed and it is known that a character string "DEF" is added newly to the character string ABC" and the graphics of a triangle that are present originally. Reference numeral 404 denotes a PDF drawing command for drawing the character strings and the graphics in the edited document 403. Reference numeral 405 denotes a difference (edited portion) between the original document 401 and the edited document 403, showing that the above-described character string "DEF" is extracted as the edited portion. Reference numeral 406 denotes a PDF drawing command corresponding to the extracted edited portion. Information on the extracted edited portion is stored in the RAM 202.

A document analysis unit 312 performs processing to analyze the original document and processing to analyze the edited portion described in 2). In the analysis of the original document, after the types of the drawing commands of all the objects that are drawn in the original document are specified, a list (hereinafter, a command list) including information on the number of drawing commands for each drawing command is created. In the analysis of the edited portion, the type of the drawing command of the edited portion extracted in 1) is specified. Details of the analysis processing of the original document and the edited portion will be described later.

A drawing command attribute determination unit 313 performs processing to determine the attribute of the drawing command of the edited portion described in 3). Specifically, the drawing command attribute determination unit 313 performs processing to appropriately convert the form of representation (attribute of the drawing command) of the edited portion so that the drawing command of the edited portion extracted by the edited portion extraction unit 311 conforms with the original document. Details of the processing to determine the attribute of the drawing command will also be described later.

A document integration unit 314 performs processing to integrate the edited portion for which the form of representation has been determined with the original document described in 4). Specifically, the document integration unit 314 integrates the drawing command of the edited portion determined by the drawing command attribute determination unit 313 with the drawing command of the original document.

A communication unit 320 performs transmission and reception of various types of data, such as the original document and the edited document, in accordance with instructions from the document management unit 300. For example, data of the original document in which the contents of editing are reflected is sent to the printing apparatus 103 via the communication unit 320.

The printing apparatus 103 interprets the drawing command of the received document and converts the document into a binary image, and then, forms an image based on the binary image on a printing medium by using a print engine. At this time, as described at the beginning of the specification, image processing in accordance with the attribute of the object is performed. For example, control is performed so that image processing dedicated to text (e.g., processing to sharpen an edge) is performed in the case where text is printed, image processing dedicated to a photo (e.g., blurring processing) is performed in the case where an image is printed, and any image processing is not performed in the case where a graphics is printed.

In the present embodiment, the drawing command corresponding to the information newly added by editing is integrated with the original document after it is converted into one that conforms with the drawing command used in the original document, and therefore, no discrepancy between attributes will occur. In other words, in the printing processing of the document in which the contents of editing are reflected, the attribute is made the same and the same image processing is applied. Consequently, even in the case where the document in which the contents of editing are reflected is printed, such a problem that the tint is different between the newly added object and the original object does not occur.

Figure 5B:
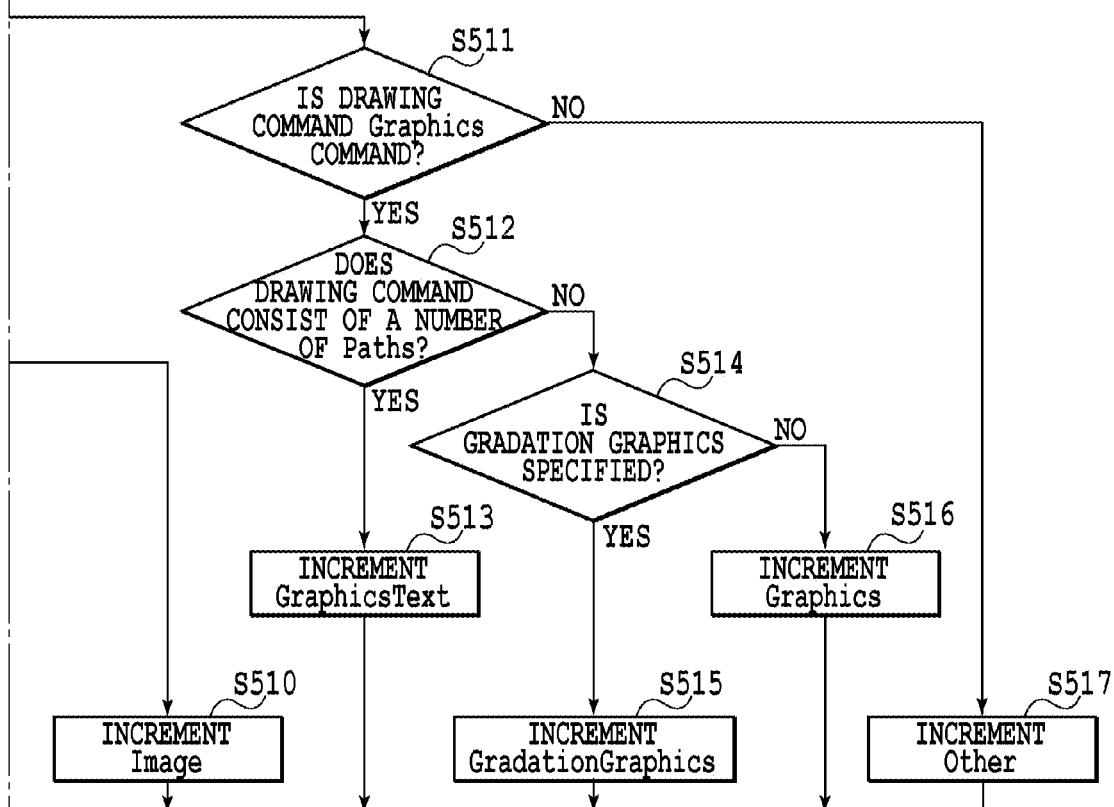

Next, details of the processing in the document analysis unit 312 are explained. Here, explanation is given by taking the case of the analysis processing (command list creation processing) of the original document as an example. FIGS. 5A and 5B are flowcharts showing a flow of command list creation processing.

At step 501, the document analysis unit 312 determines whether any of the drawing commands within the original document is a Text command. It is possible to identify the type of a drawing command by classifying in advance the drawing commands according to the contents that follow "/Type/". For example, it is sufficient to classify a drawing command that begins with "/Type/Text" as a Text command, a drawing command that begins with "/Type/Image" as an Image command, a drawing command that begins with "/Type/Graphics" as a Graphics command, and so on. In the case where the results of the determination indicate that the drawing command is the Text command, the processing proceeds to step 502. On the other hand, in the case where the drawing command is not the Text command, the processing proceeds to step 505.

At step 502, the document analysis unit 312 determines whether the drawing command determined to be the Text command consists of a Path. The method for drawing Text can be roughly divided into a method for drawing an outline with a dot string and a method for drawing an image. The dot string that constitutes an outline is called a Path and in the case where the Text command consists of a Path, the processing proceeds to step 503. On the other hand, in the case where the Text command does not consist of a Path, the processing proceeds to step 504.

At step 503, the document analysis unit 312 increments the counter of "PathText" indicating that the drawing command is the Text command consisting of a Path.

At step 504, the document analysis unit 312 increments the counter of "ImageText" indicating that the drawing command is the Text command not consisting of a Path.

At step 505, the document analysis unit 312 determines whether the drawing command is the Image command. In the case where the results of the determination indicate that the drawing command is the Image command, the processing proceeds to step 506. On the other hand, in the case where the drawing command is not the Image command, the processing proceeds to step 511.

At step 506, the document analysis unit 312 determines whether the drawing command is the Image command that specifies a full-scale image. Specifically, the page area and the image area are compared and in the case where the difference between both areas is within a predetermined range (e.g., within 5%), it is determined that the Image command is the drawing command that specifies a full-scale image. In the case where the results of the determination indicate that the drawing command is the Image command that specifies a full-scale image, the processing proceeds to step 507. On the other hand, in the case where the drawing command is not the Image command that specifies a full-scale image, the processing proceeds to step 508.

At step 507, the document analysis unit 312 increments the counter of "ScanImage" indicating that the drawing command is the Image command that specifies a full-scale image.

At step 508, the document analysis unit 312 determines whether the drawing command is the Image command that specifies a gradation image. It is possible to determine whether a gradation image is specified by determining whether the contents of the image that is drawn by the Image command conform with a predetermined pattern, such as LinerGradation, RdialGradation, and three-pointGradaion (by performing pattern matching). In the case where the results of the determination indicate that the drawing command is the Image command that specifies a gradation image, the processing proceeds to step 509. On the other hand, in the case where the drawing command is not the Image command that specifies a gradation image, the processing proceeds to step 510.

At step 509, the document analysis unit 312 increments the counter of "GradationImage" indicating that the drawing command is the Image command that specifies a gradation image.

At step 510, the document analysis unit 312 increments the counter of "Image" indicating that the drawing command is the Image command that specifies another image.

At step 511, the document analysis unit 312 determines whether the drawing command is the Graphics command. In the case where the results of the determination indicate that the drawing command is the Graphics command, the processing proceeds to step 512. On the other hand, in the case where the drawing command is not the Graphics command, the processing proceeds to step 517.

At step 512, the document analysis unit 312 determines whether the drawing command is the Graphics command whose number of Paths per unit area is equal to or greater than a predetermined threshold value (e.g., 100). In the case where the results of the determination indicate that the drawing command is the Graphics command whose number of Paths per unit area is equal to or greater than a predetermined threshold value, the processing proceeds to step 513. On the other hand, in the case where the drawing command is not the Graphics command whose number of Paths per unit area is equal to or greater than a predetermined threshold value, the processing proceeds to step 514.

At step 513, the document analysis unit 312 increments the counter of "GraphicsText" indicating that the drawing command is the Graphics command representing a character consisting of a number of Paths.

At step 514, the document analysis unit 312 determines whether the drawing command is the Graphics command that specifies a gradation graphics. It is possible to determine whether a gradation graphics is specified by determining, for example, whether "ShadingType/" is included within the drawing command. In the case where the results of the determination indicate that the drawing command is the Graphics command that specifies a gradation graphics, the processing proceeds to step 515. On the other hand, in the case where the drawing command is not the Graphics command that specifies a gradation graphics, the processing proceeds to step 516.

At step 515, the document analysis unit 312 increments the counter of "GradationGraphics" indicating that the drawing command is the Graphics command that specifies a gradation graphics.

At step 516, the document analysis unit 312 increments the counter of "Graphics" indicating that the drawing command is the Graphics command that specifies a graphics other than a gradation graphics.

At step 517, the document analysis unit 312 increments the counter of "Other" indicating that the drawing command specifies other drawings.

At step 518, the document analysis unit 312 determines whether there is a drawing command on which the processing has not been performed yet as to the original document to be subjected to the processing. In the case where there is a drawing command on which the processing has not been performed yet, the processing returns to step 501 and the processing is performed on the next drawing command continuously. On the other hand, in the case where there is no drawing command on which the processing has not been performed yet, the processing proceeds to step 519.

Figure 6:
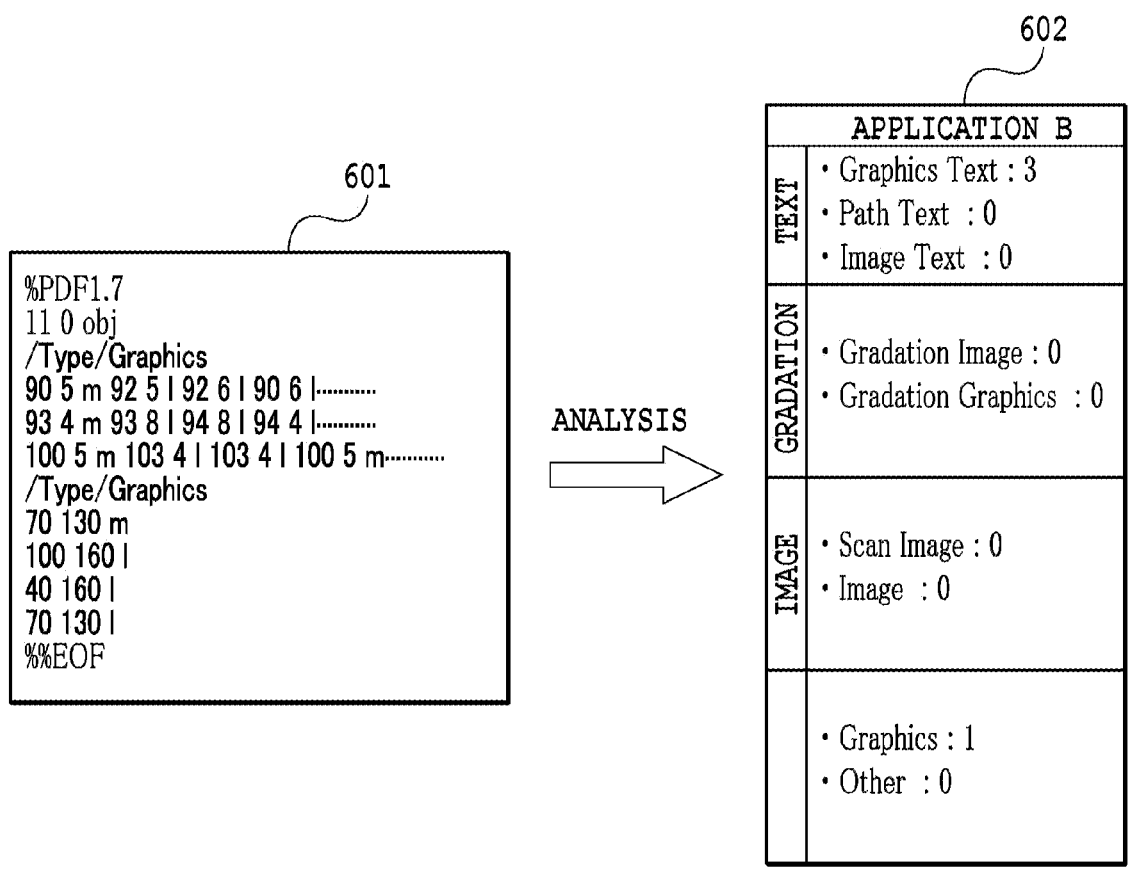
FIG. 6 is a diagram showing an example of a command list.

At step 519, the document analysis unit 312 sums the count results (count values) of all the counters and generates a command list including information on the types and the number of drawing commands included in the original document. FIG. 6 shows an example of a command list that is generated at this step. Reference numeral 601 denotes the same PDF drawing command as the PDF drawing command 402 corresponding to the original document 401 described previously and as the results of analyzing this, a command list such as denoted by 602 is obtained. From the command list 602, it is known that the original document 401 consists of four drawing commands in total: three GraphicsText commands and one Graphics command. To the command list 602, the name of the application "Application B" is added as information for specifying the application used to create the original document.

The above is the contents of the command list creation processing and the generated command list is stored in the RAM 202 or the like. The analysis processing of the edited portion is basically the same. However, in the analysis processing of the edited portion, the information on the number of drawing commands for each type of the drawing command is not necessary, and therefore, the count processing is not performed and in the stage where all the types of the drawing commands of the edited portion are determined, the processing is completed.

Figure 7:
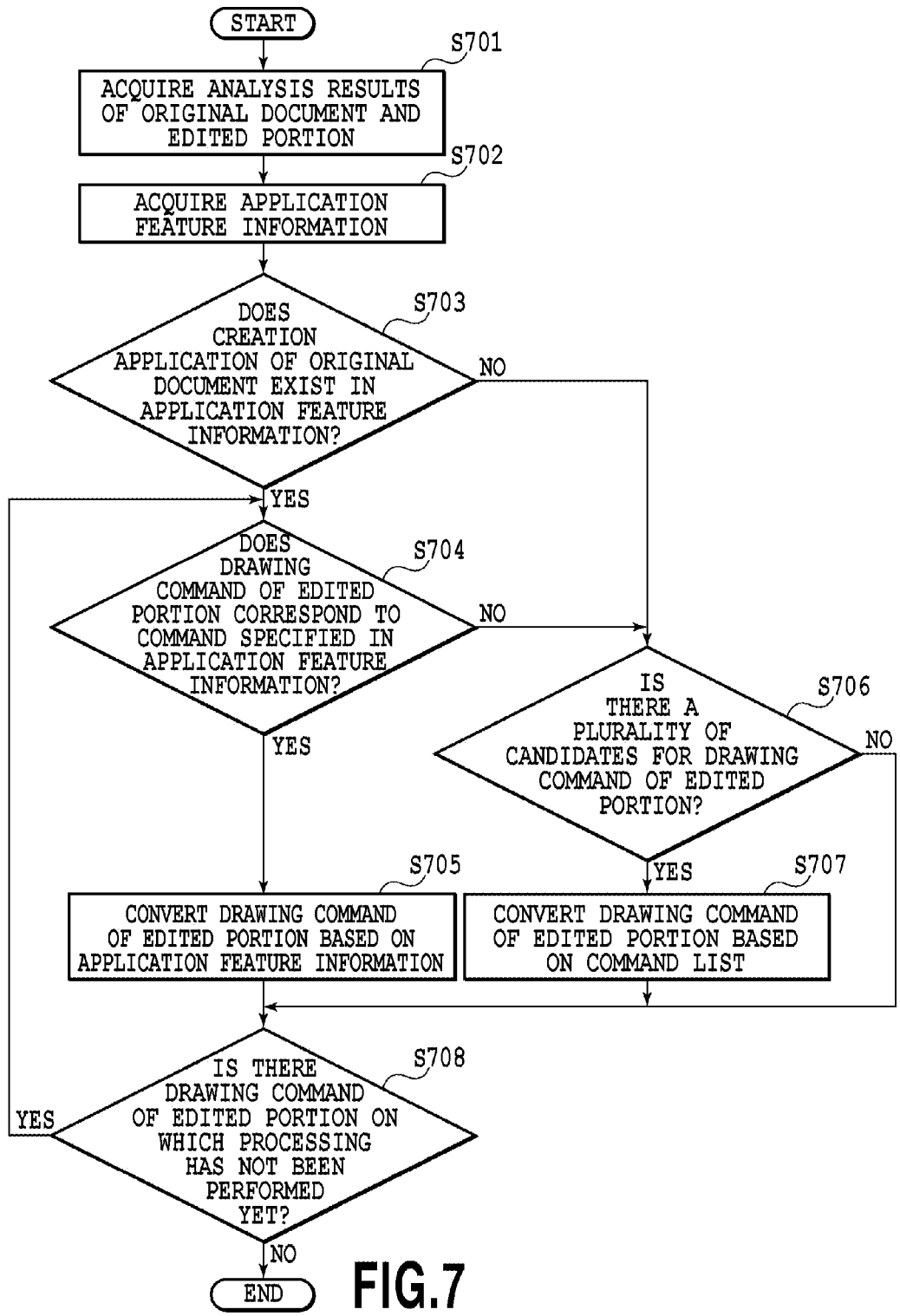
FIG. 7 is a flowchart showing a flow of drawing command attribute determination processing.

Subsequently, details of the processing to determine the attribute of the drawing command for the edited portion in the drawing command attribute determination unit 313 are explained. FIG. 7 is a flowchart showing a flow of drawing command attribute determination processing.

At step 701, the drawing command attribute determination unit 313 acquires the analysis results of the original document and the analysis results of the edited portion (i.e., the command list of the original document and the data of the drawing commands of the edited portion) from the RAM. 202 or the like.

At step 702, the drawing command attribute determination unit 313 acquires information (hereinafter, application feature information) indicating the feature on the form of representation in the application capable of creating a document in a specific format (in the present embodiment, PDF). Here, the application feature information is explained.

Even in the case of documents having the same format and including the same image with the same contents, on a condition that the applications used to create the documents are different, the way of representation may be different between the documents. For example, in the case where a PDF document is created, there is an application that represents gradation as one image (bitmap data) or there is an application that represents gradation as an aggregation of a number of graphics (i.e., graphic data). Further, there is an application that represents a character by a character code or there is an application that represents a character by a graphics (i.e., graphic data). Furthermore, there is an application that represents a rectangle as a graphics whose coordinates of the positions of the four vertexes are specified or there is an application that represents a rectangle as an image. Information obtained by collecting information about the feature on the form of representation of an object for each application and summarizing the information into a list format is called "application feature information" in the present specification. Then, by using such application feature information, it is made possible to convert the drawing command in relation to the edited portion where necessary in accordance with the feature of each application. FIG. 8 is a diagram showing an example of the application feature information. In the application feature information in FIG. 8, the features of four types of applications A to D capable of creating a PDF document are described. The feature of the application A "Gradation by Image" represents the feature that gradation is drawn by an image. The feature of the application B "Text by Graphics" represents the feature that text is drawn by a graphics. The feature of the application C "Rectangle by Image" represents the feature that a rectangle is drawn by an image. The feature of the application D "Rectangle by Fill" represents the feature that a rectangle is drawn by a graphics whose coordinates of the positions of the four vertexes are specified. As described above, the application feature information is information in which the application name and the feature on the form of representation of an object in the application are associated with each other for each application.

At step 703, the drawing command attribute determination unit 313 determines whether the application that matches with the application used to create the original document to be edited exists in the application feature information by referring to the command list. In the case where the application that matches with the application used to create the original document exists in the application feature information, the processing proceeds to step 704. On the other hand, in the case where the application that matches with the application used to create the original document does not exist in the application feature information, the processing proceeds to step 706.

At step 704, the drawing command attribute determination unit 313 determines whether the drawing command of the edited portion corresponds to the drawing command in relation to the feature of the application by referring to the feature information on the corresponding application. For example, in the case where the original document is created by the application B (see FIG. 8), the feature is "Text by Graphics", and therefore, in the case where the drawing command of the edited portion is the Text command, it is determined that the drawing command of the edited portion "corresponds" to the drawing command in relation to the feature of the application. In the case where the results of the determination indicate that the drawing command of the edited portion corresponds to the drawing command in relation to the feature of the creation application of the original document, the processing proceeds to step 705. On the other hand, in the case where the drawing command of the edited portion does not correspond to the drawing command in relation to the feature of the creation application of the original document, the processing proceeds to step 706.

Figure 9:
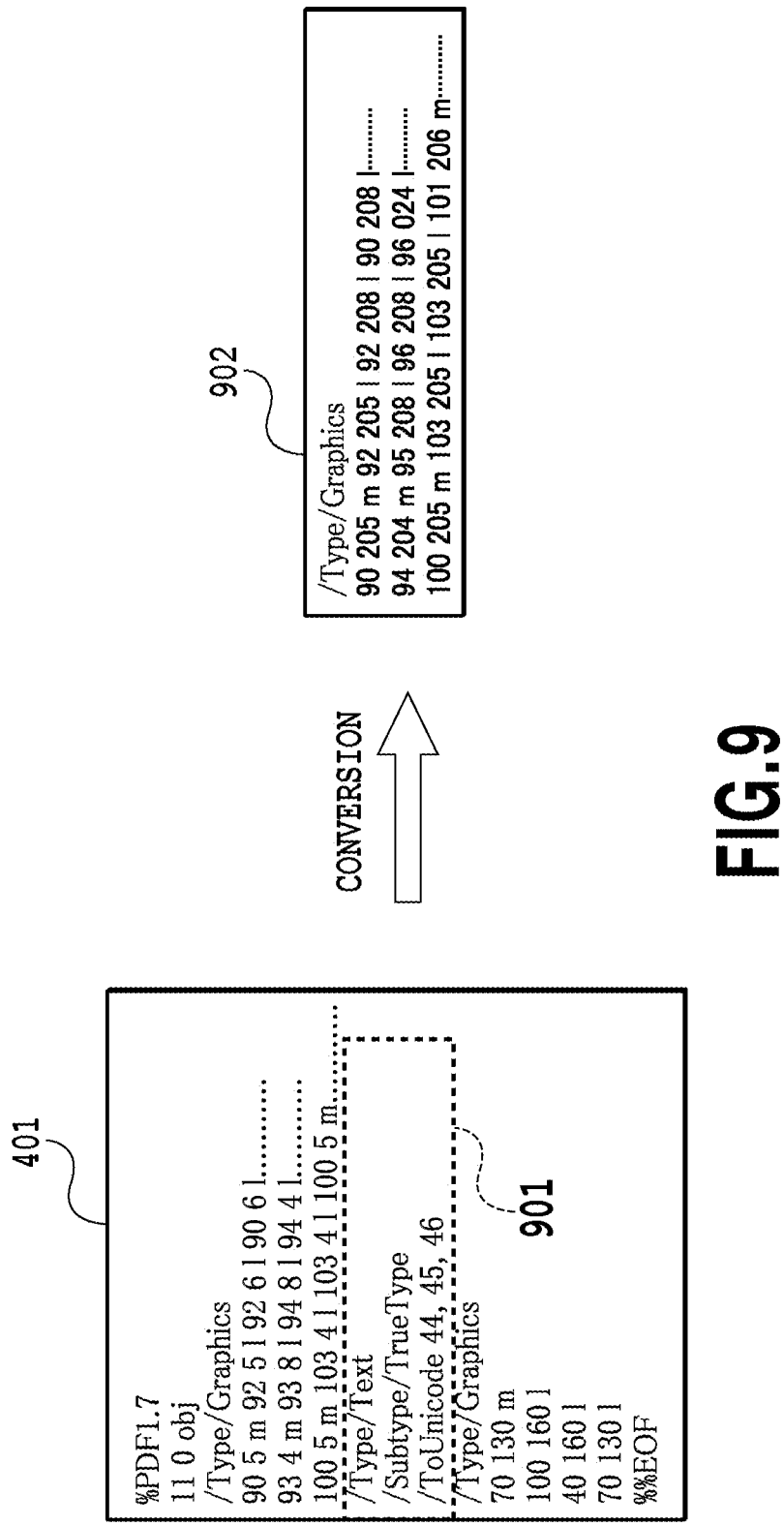
FIG. 9 is a diagram showing an example in which a drawing command of an edited portion is converted based on application feature information.

At step 705, the drawing command attribute determination unit 313 converts the drawing command of the edited portion so as to be in accordance with the feature of the original document where necessary based on the application feature information. FIG. 9 is a diagram showing an example in which the drawing command of the edited portion is converted based on the application feature information. In FIG. 9, a frame 901 indicates the drawing command of the edited portion (corresponding to the added character string "DEF") in the PDF drawing command 401 for drawing the character strings and graphics in the edited document 403. A frame 902 indicates the drawing command of the edited portion after the conversion, wherein the Text command has been converted into the Graphics command (GraphicsText) in accordance with "Text by Graphics", which is the feature of the application B used to create the original document. In the example in FIG. 9, the drawing command of the edited portion is converted by converting the attribute of the drawing command from Text into Graphics and converting the drawing command described by the font type and character code into the drawing command described by paths. This conversion is carried out in an RIP module, not shown. In the case where the drawing command of the edited portion corresponding to "DEF" is originally the Graphics command, the drawing command is maintained without being converted.

At step 706, the drawing command attribute determination unit 313 determines whether a plurality of candidates exists for the drawing command of the edited portion. As is obvious from the command list shown in FIG. 6 described previously, for example, in the case of text, a plurality of candidates exits, such as PathText, ImageText, and GraphicsText. Similarly, for example, in the case of gradation, a plurality of candidates exists, such as GradationImage and GradationGraphics. Because of this, whether a plurality of candidates exists is determined for the drawing command of the edited portion. In the case where the results of the determination indicate that a plurality of candidates exists, the processing proceeds to step 707. On the other hand, in the case where a plurality of candidates does not exist, processing proceeds to step 708 without converting the drawing command of the edited portion because conversion is not necessary.

Figure 10:
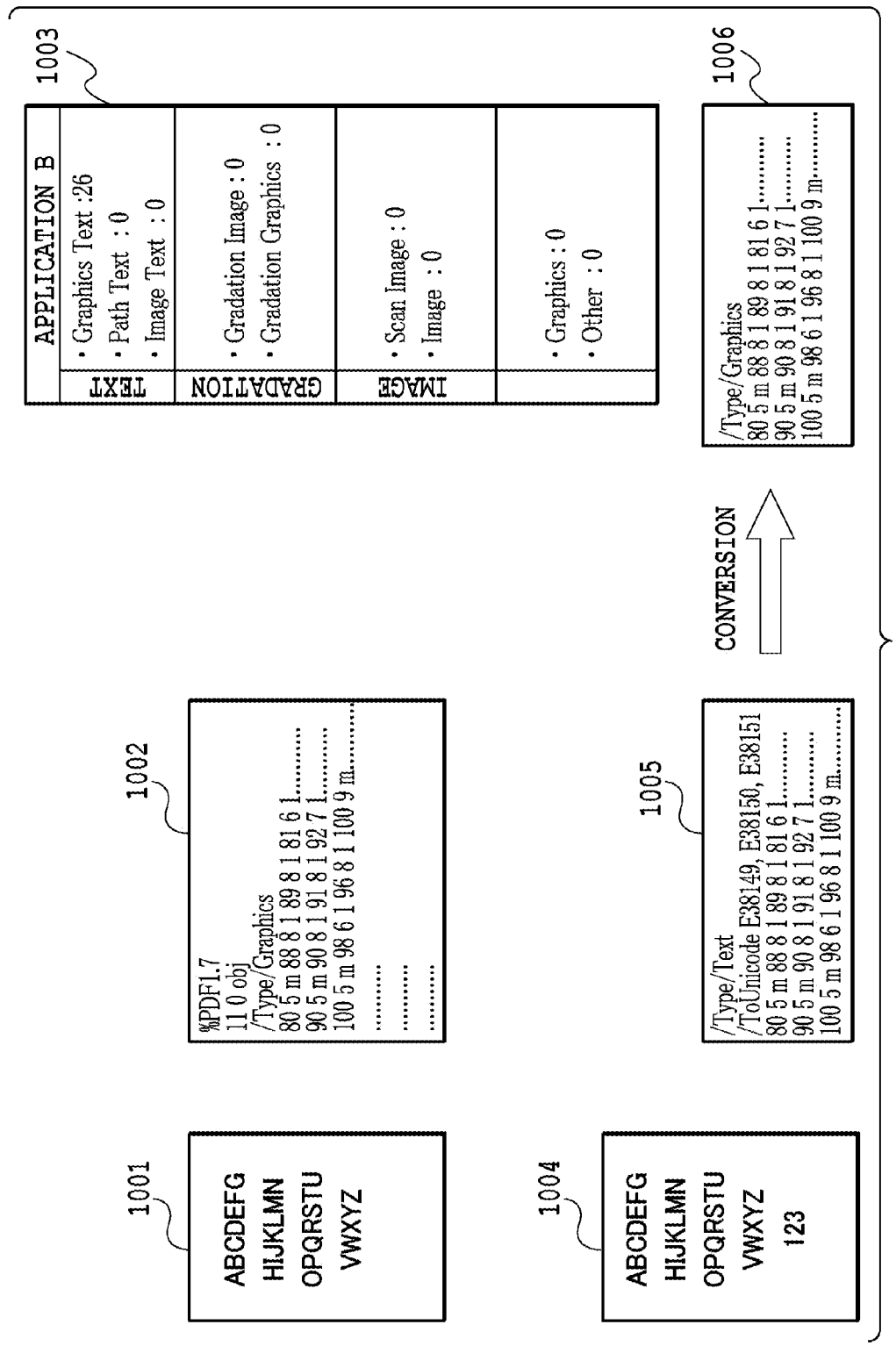
FIG. 10 is a diagram showing an example in which the drawing command of the edited portion is converted based on a command list.

At step 707, the drawing command attribute determination unit 313 converts the drawing command of the edited portion where necessary based on the command list of the original document. Specifically, the drawing command of the edited portion is converted into the drawing command whose count number is equal to or greater than 1 in the command list among a plurality of candidates (in the case where there is a plurality of drawing commands whose count number is equal to or greater than 1 within the command list, into the drawing command whose count number is the greatest). FIG. 10 is a diagram showing an example in which the drawing command of the edited portion is converted based on the command list. In FIG. 10, reference numeral 1011 denotes an original PDF document including a character string from "A" to "Z" and 1002 denotes a drawing command (consisting of GraphicsText) of the character string. Reference numeral 1003 denotes a command list created from the drawing command 1002 and only the count number of GraphicsText is 26 and the other count numbers are all 0. Then, reference numeral 1004 denotes an edited document to which a character string "123" is added, 1005 denotes the drawing command (consisting of PathText) of the edited portion corresponding to the character string "123" extracted from the edited document by the edited portion extraction unit 311, and 1006 denotes the drawing command (consisting of GraphicsText) of the edited portion converted by the drawing command attribute determination unit 313 in accordance with the command list 1003. It is known that the drawing command 1005 of the edited portion consisting of "PathText" has been converted so as to match with "GraphicsText", only the count number of which is equal to or greater than 1 in the command list 1003.

At step 708, the drawing command attribute determination unit 313 determines whether there is a drawing command of the edited portion on which the processing has not been performed yet. In the case where there is a drawing command of the edited portion on which the processing has not been performed yet, the processing returns to step 703 and the processing is performed continuously on the next drawing command of the edited portion. On the other hand, in the case where there is no drawing command of the edited portion on which the processing has not been performed yet, the present processing is terminated.

Figure 11:
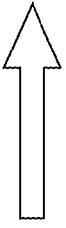
FIG. 11 is a diagram explaining the way the drawing command (after conversion) of the edited portion is integrated with an original document.

The above is the contents of the drawing command attribute determination processing. The data of the drawing command of the edited portion converted where necessary by this processing is sent to the document integration unit 314 and integrated with the original document. FIG. 11 is a diagram explaining the way the drawing command (after conversion) of the edited portion is integrated with the original document. In FIG. 11, reference numeral 1101 denotes the original document, which is the same as the original document 601 shown in FIG. 6. Reference numeral 1102 denotes the original document after integration and in which a drawing command 1103 (the same as the drawing command 902 after conversion shown in FIG. 9) of the edited portion, which has been converted from "Text" into "Graphics (GraphicsText)" in accordance with the application feature information, is incorporated.

As described above, in the present embodiment, in the case where contents of editing are reflected in the original document, the drawing command of the edited portion is converted into the drawing command in accordance with the feature of the original document.

In the present embodiment, the document data itself after editing is received and the edited portion is extracted by the edited portion extraction unit 311 within the server 104. However, the present embodiment is not limited to such an aspect. For example, it may also be possible to extract the edited portion from the PC 101 or the mobile terminal 102 that edits the document and to send only the information on the extracted edited portion (data of the drawing command of the edited portion) to the server 104. Due to this, it is possible to reduce the burden of processing on the server side.

Further, it may also be possible to send only the information on the contents of editing (instructions to add an annotation of "Confidential" by specifying the position, size, and color, or the like) to the server 104 from the PC 101 or the mobile terminal 102. In this case, it is sufficient to reflect the contents of editing specified by the acquired information in the original document after determining the drawing command so as to be the drawing command in accordance with the original document in the server 104.

Furthermore, it may also be possible to implement the processing that is performed by the server 104 of the Web service in the present embodiment by an application of cloud computing. Alternatively, it may also be possible to implement all the processing that is performed in the present system by an information processing apparatus alone, such as the server 104, the PC 101, and the mobile terminal 102.

According to the present embodiment, the drawing command corresponding to the information that is desired to be added to the original document is integrated with the original document after being converted in accordance with the drawing command used in the original document. Because of this, the same image processing is applied to the same type of objects without causing any discrepancy between the attributes to occur in the document after integration. Consequently, even in the case where the document after integration is printed, it is possible to prevent such a problem that the tint is different between objects from occurring.

Second Embodiment

In the first embodiment, the drawing command is converted so that the attribute of the drawing command of the edited portion is in accordance with the original document. Next, an aspect is explained as a second embodiment in which the drawing command of the edited portion is not converted under a fixed condition.

Figure 12:
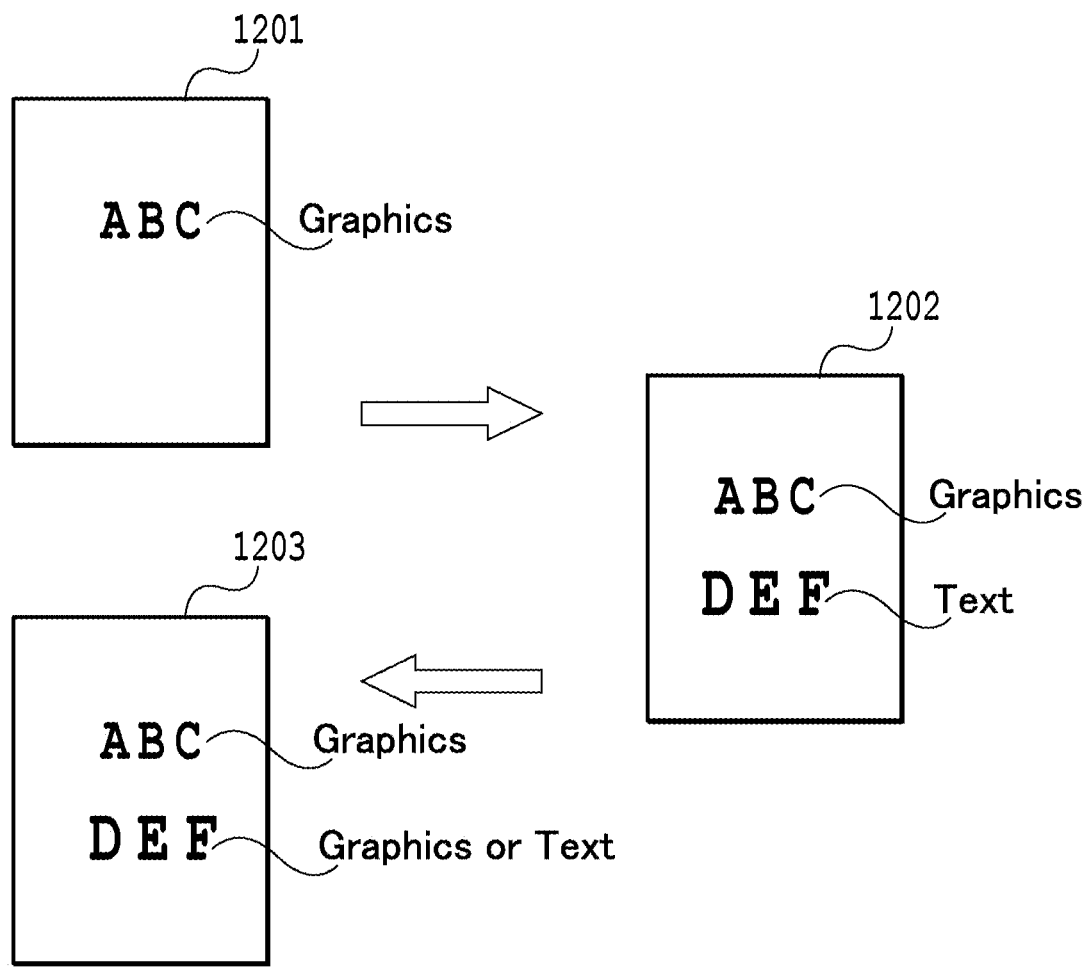
FIG. 12 is a diagram explaining an example in the case where the drawing command of the edited portion is maintained without being converted.

Specifically, in the processing at step 705 and step 707 of the flowchart in FIG. 7 described previously, whether conversion is carried out is determined by taking into consideration the color, font size, continuity, etc. FIG. 12 is a diagram explaining an example of the case where the drawing command of the edited portion is maintained without being converted. In FIG. 12, reference numeral 1201 denotes the original document that has been edited and the character string "ABC" is drawn by the Graphics command. Reference numeral 1202 denotes the edited document after editing and a one-size larger character string "DEF" is newly added to the character string "ABC" by the Text command. Reference numeral 123 denotes the original document in which the contents of editing are reflected and shows that the character string "DEF" that has been newly added is not converted into the character string drawn by the Graphics command and is reflected as the character string drawn by the Text command under a fixed condition.

In the first embodiment, the character string "DEF" is added after the drawing command of the character string "DEF" is converted into the Graphics command in accordance with the feature of the original document. In the present embodiment, whether the color and font size of the character that is added match with the color and font size of the character existing in the original document is determined, and in the case where they do not match with each other, it is determined that the drawing is formed based on a different intention and is added with the default drawing command (here, the Text command).

In this case, whether the font size of the character that is added matches with the font size of the character existing in the original document is determined by, for example, determining whether a ratio of change is within a range of a predetermined ratio of change (e.g., 30%). This also applies to color. Consequently, in the case where the ratio of change of the above-described one-size larger character string "DEF" is within the range of the predetermined ratio of change, the Text command is converted into the Graphics command and in the case where the ratio of change is outside the range of the predetermined ratio of range, the Text command is maintained without being converted.

Further, it may also be possible to determine whether there is continuity as a character string based on the distance between the character string "ABC" in the original document and the character string "DEF" that is added, and in the case where it is determined that there is no continuity, it may be possible to regard the character string "DEF" as a drawing formed based on a different intention, and to add the character string "DEF" with the default drawing command. For example, it is possible to implement this by referring only to the drawing commands of the character strings at the time of conversion within a predetermined range (e.g., within 1,000 pixels) of the character string that is added.

Third Embodiment

The first and second embodiments premise editing between the same format. The contents described in the above-described embodiments can also be applied to editing accompanied by format conversion.

FIGS. 13A and 13B are diagrams explaining an example of the case where the above-described contents are applied to editing accompanied by format conversion. Here, as shown in FIG. 13A, the case is supposed where conversion from PDF into SVG is carried out first, then, editing is performed in SVG, and conversion into PDF is carried out again.

At the time of carrying out conversion into PDF again, in the case where all the SVG commands are converted into PDF commands, a PDF document having a configuration different from that of the original PDF document will result. Because of this, only the SVG commands of the edited portion are converted into PDF commands and then the edited portion is integrated with the original PDF document (FIG. 13B). By applying the methods of the first and second embodiments at the time of conversion from the SVG command into the PDF command, it is possible to obtain an edited PDF document in the command system in accordance with the feature of the original PDF document.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, even in the case where the original document is edited, a sense of incongruity, such as a difference in tint, is unlikely to be caused at the time of printing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-146086, filed Jul. 16, 2014 which is hereby incorporated by reference herein in its entirety.

What is claimed is:

1. An information processing apparatus comprising:
a memory; and
at least one processor that executes a computer program in the memory to control the information processing apparatus to function as units comprising:
an obtaining unit configured to obtain information corresponding to an editing portion which is a difference between an edited document and an original document;
a specifying unit configured to specify a form of representation of objects included in the original document;
a converting unit configured to convert the information corresponding to the editing portion so that a form of representation of the editing portion conforms with the specified form of representation of the objects included in the original document; and
an integration unit configured to integrate the converted information corresponding to the editing portion with the original document.

2. The information processing apparatus according to claim 1, wherein
the converting unit converts at least one of an attribute and a drawing command which are included in information corresponding to the editing portion so that the form of representation of the editing portion conforms with the specified form of representation of objects included in the original document.

3. The information processing apparatus according to claim 1, further comprising a unit configured to acquire feature information indicating a form of representation of an object for each application used to create a document, wherein
the specifying unit specifies the form of representation of objects included in the original document based on the acquired feature information.

4. The information processing apparatus according to claim 3, wherein
the feature information is information in which the name of an application is associated with a form of representation of an object included in a document created by the application, and
wherein the specifying unit specifies, in a case where an application whose name matches with the name of the application used to create the original document is included in the feature information, the form of representation of the object being associated with the matched application as the form of representation of the object included in the original document.

5. The information processing apparatus according to claim 1, wherein
the specifying unit is configured to specify the form of representation of objects included in the original document by analyzing the original document.

6. The information processing apparatus according to claim 5, wherein
the specifying unit specifies the form of representation of the objects included in the original document by creating a list including information on the types and the number of drawing commands of objects included in the original document.

7. The information processing apparatus according to claim 6, wherein
the converting unit converts, in a case where there is a plurality of candidates for converting the information corresponding to the editing portion, the information corresponding to the editing portion so that the form of representation of the editing portion conforms with a form of representation of a drawing command whose number is equal to or greater than 1 in the list among the plurality of candidates.

8. The information processing apparatus according to claim 7, wherein
the converting unit converts, in a case where there is a plurality of drawing commands whose number is equal to or greater than 1, the information corresponding to the editing portion so that the form of representation of the editing portion conforms with a form of representation of a drawing command whose number is the greatest.

9. The information processing apparatus according to claim 1, wherein
the converting unit does not convert the information corresponding to the editing portion in a case where a predetermined condition is met.

10. An information processing apparatus comprising:
a memory; and
at least one processor that executes a computer program in the memory to control the information processing apparatus to function as units comprising:
an obtaining unit configured to obtain information corresponding to an editing portion which is a difference between an edited document and an original document;
a converting unit configured to convert the information corresponding to the editing portion so that a form of representation of the editing portion conforms with the original document, wherein the converting unit does not convert the information corresponding to the editing portion in a case where a predetermined condition is met, the predetermined condition including at least one of the difference in color between objects, the difference in font size between objects, and the absence of continuity of objects; and
an integration unit configured to integrate the converted information corresponding to the editing portion with the original document.

11. The information processing apparatus according to claim 1, wherein
the obtaining unit obtains the information corresponding to the editing portion-by comparing the original document with the edited document.

12. An information processing method comprising the steps of:
- obtaining information corresponding to an editing portion which is a difference between an edited document and an original document;
- specifying a form of representation of objects included in the original document;
- converting the information corresponding to the editing portion so that a form of representation of the editing portion conforms with the specified form of representation of the object included in the original document; and
- integrating the converted information corresponding to the editing portion with the original document.

13. A non-transitory computer readable storage medium storing a program for causing a computer to perform the following steps of:
- obtaining information corresponding to an editing portion which is a difference between an edited document and an original document;
- specifying a form of representation of objects included in the original document;
- converting the information corresponding to the editing portion so that a form of representation of the editing portion conforms with the specified form of representation of the object included in the original document; and
- integrating the converted information corresponding to the editing portion with the original document.

* * * * *